United States Patent
Shull

[19]

[11] Patent Number: 6,006,077

[45] Date of Patent: Dec. 21, 1999

[54] RECEIVED SIGNAL STRENGTH DETERMINATION METHODS AND SYSTEMS

[75] Inventor: Eric A. Shull, Raleigh, N.C.

[73] Assignee: Ericsson Inc., Research Triangle Park, N.C.

[21] Appl. No.: 08/942,645

[22] Filed: Oct. 2, 1997

[51] Int. Cl.$^6$ .................................................. H04B 17/00
[52] U.S. Cl. ...................................... 455/226.2; 455/226.4
[58] Field of Search .............................. 455/226.2, 226.4; 375/227, 317

[56] References Cited

U.S. PATENT DOCUMENTS

| | | | |
|---|---|---|---|
| 4,479,253 | 10/1984 | Daniel, Jr. ............................ | 455/226.2 |
| 4,578,820 | 3/1986 | Highton ................................. | 455/226.2 |
| 4,580,287 | 4/1986 | Richards, Jr. ........................ | 455/226.4 |
| 4,619,002 | 10/1986 | Thro ..................................... | 375/317 |
| 5,390,365 | 2/1995 | Enoki et al. .......................... | 455/553 |
| 5,408,696 | 4/1995 | Hofverberg .......................... | 455/226.2 |
| 5,701,601 | 12/1997 | Tomoe et al. ........................ | 455/226.2 |
| 5,875,390 | 2/1999 | Brehmer et al. ..................... | 455/226.2 |

FOREIGN PATENT DOCUMENTS

| | | | |
|---|---|---|---|
| 505072-A2 | 9/1992 | European Pat. Off. ............ | 455/226.2 |
| 0 601 987 | 6/1994 | European Pat. Off. . | |
| 639901-A2 | 2/1995 | European Pat. Off. ............ | 455/226.2 |
| 0 755 133 | 1/1997 | European Pat. Off. . | |
| 0785 640 | 7/1997 | European Pat. Off. . | |
| 405063663 | 3/1993 | Japan ................................. | 455/226.2 |

*Primary Examiner*—Reinhard J. Eisenzopf
*Assistant Examiner*—Eliseo Ramos-Feliciano
*Attorney, Agent, or Firm*—Myers Bigel Sibley & Sajovec

[57] ABSTRACT

A signal strength for a received signal such as a radio signal transmitted over a communication network is determined. The signal strength measurement is compensated for non-linear characteristics of the receiver. The compensation is provided by taking two signal strength readings with the receiver set at two different, known, gain levels. The difference between the expected change in the signal strength and the change actually measured by the receiver is used to generate a compensated signal strength measurement. A table of compensation factors is generated for each signal strength which is also utilized in generating the compensated signal strength measurement. The compensated signal strength measurement reading is transmitted to the communication network for use in mobile assisted handover.

20 Claims, 4 Drawing Sheets

RECEIVED SIGNAL STRENGTH DETERMINATION METHODS AND SYSTEMS

FIELD OF THE INVENTION

The invention relates to communication networks and, more particularly, to the determination of received signal strength in communication networks.

BACKGROUND OF THE INVENTION

Communication networks typically include at least one sender and one receiver. In either a wired or wireless network, a signal transmitted between the sender and receiver must be of sufficient magnitude (or strength) to allow the information contained within the signal to be discriminated from the noise which is generally present in the communication network. This may be a greater problem with a wireless network, which typically is more susceptible to noise from various interference sources.

An example of a wireless network is a radio network such as a cellular network commonly utilized for voice and/or data communications between a fixed base station covering a geographic region and mobile devices such as cellular terminals (or phones) present in the covered region. A cellular phone typically includes a radio receiver including an antenna for receiving signals and an amplifier/detector for generating a measure of the strength of received signals or noise. A signal strength measure, commonly known as Radio Signal Strength Indication (RSSI), may be expressed as a logarithmic measure of received signal strength and may be converted to a digital form by an analog to digital converter.

It is known in the prior art that radio signal strength measurements can be useful in determining which base station should serve a cellular phone during a call. In the U.S. AMPS system, the mobile phone would typically use such signal strength measurements to determine the strongest base station to which it should listen for calls during standby (idle) mode. Also in the U.S. AMPS system, base stations belonging to the cellular network typically listen to the signal strengths received from mobile phones that are actively transmitting during calls, and the network uses its measurements to determine an optimum base station for handling a call in progress. When a call in progress is switched from one base station to another, it is commonly known as "handover" or "handoff." Handoffs enable calls to be maintained even though the mobile phone may be changing location.

Cellular phones using a Time Division Multiple Access method conforming to either the European cellular standard known as GSM or any of the American TDMA standards, for example, those known respectively as D-AMPS, IS54, IS136 or PCS1900, may use spare time between transmit and receive timeslots to change frequency and monitor the signal strengths of other base stations. Several measurements of signal strength may be averaged for the same base station. The mobile phone makes measurements of the signal strengths received from surrounding base stations even during the progress of a call. Mobile Assisted Handover (MAHO) may be implemented using these measurements. The averages are typically reported to the currently serving base station, which determines if a handoff should be made to another, base station. The mobile typically reports MAHO RSSI measurements to the network station using a low-bitrate, inband signaling channel called the Slow Associated Control Channel or SACCH. The network uses SACCH measurements to determine the optimum base station to handle a call in progress, preferably the base station that the mobile phone is receiving most strongly.

In order for MAHO to operate effectively, it is preferred that the RSSI measurements that are reported to the network using the SACCH are reasonably accurate over a wide range of signal strengths that may be encountered from base stations. It is known in the prior art to employ logarithmic IF amplifiers with progressive saturation and progressive detectors in order to produce an RSSI signal approximately proportional to the logarithm of the received signal strength. See for example U.S. Pat. Nos. 5,048,059 entitled "Logpolar Signal Processing" and 5,070,303 entitled "Logarithmic Amplifier/Detector Delay Compensation" which are incorporated by referenced herein in their entirety.

Inaccuracy in RSSI measurements may occur when the RSSI value is not exactly proportional to (linearly related to) the received signal strength. Inaccuracy of RSSI measurements may also occur when measuring strong signals that partially saturate amplifing stages prior to the RSSI detectors; a 10 dB increase in received signal level may not then be passed through to the RSSI detectors due to the preceding amplifiers being unable to deliver a 10 dB increase in output signal. The RSSI detectors typically then register a lower increase in signal strength than is actually received. These inaccuracies may vary between mobile phones or change with temperature or other conditions that vary in operation. Therefore, there is a need for an improved means to account for such inaccuracies.

SUMMARY OF THE INVENTION

It is, therefore, an object of the present invention to provide improved and more accurate methods and systems for calculating a received signal strength indication.

It is a further object of the present invention to provide methods and systems which calculate a received signal strength indication which is compensated for non-linearity in the received signal which might otherwise cause the calculated signal strength measurement to not accurately represent the actual signal strength.

These objects are provided according to the present invention by taking first and second signal strength readings with the receiver set at first and second known gain levels, respectively. The signal strength measurement may then be compensated based on the two measurements. In particular, the difference between the expected change in the signal strength and the change actually measured by the receiver may be used, according to an embodiment of the present invention, to generate a compensated signal strength measurement.

According to one embodiment of the present invention, the compensated signal strength measurement is compensated for non-linear characteristics of the receiver. In a further embodiment of the present invention the second gain level is less than the first gain level. The methods of the present invention are particularly beneficial where the the first and second signal strength measurements are logarithmic RSSI signals.

In a further aspect of the present invention, before obtaining a first signal strength measurement, an expected strength of a next signal strength measurement of the received signal is determined. If the expected signal strength is less than a predetermined criteria, i.e., if no compensation is expected to be needed, the second signal strength measurement of the received signal is not obtained and the compensated signal strength measurement is the first signal strength.

In another embodiment of the methods of the present invention, operations for generating a compensated signal strength measurement include determining an expected difference between the first signal strength measurement and the second signal strength measurement based on the first gain level and the second gain level. The actual difference between the first signal strength measurement and the second signal strength measurement is then generated. The actual difference is compared to the expected difference to provide a signal strength compensating factor. The compensated signal strength measurement is generated based on the signal strength compensating factor. The compensated signal strength measurement may be generated by summing the signal strength compensating factor and the first signal strength measurement to provide the compensated signal strength measurement. Alternatively, a previously determined compensation factor associated with the second signal strength measurement may be obtained from a memory means. The signal strength compensating factor, the previously determined compensation factor associated with the second signal strength measurement and the first signal strength measurement are then summed to provide the compensated signal strength measurement.

In a further aspect of the present invention, the compensated signal strength measurement is transmitted to the network for use in mobile assisted handover. Alternatively, the compensated signal strength measurement may be averaged with an earlier compensated signal strength measurement to provide an averaged signal strength measurement for transmission to the network.

In another aspect of the present invention, a table of compensation factors may be dynamically maintained. According to this aspect of the methods of the present invention, a previously determined compensation factor associated with the second signal strength measurement is obtained. The previously determined compensation factor associated with the second signal strength measurement is adjusted based on the calculated signal strength compensating factor to provide an updated compensation factor associated with the second signal strength measurement.

A system for measuring a strength of a received signal is also provided according to the present invention. The system includes a receiver capable of operating at a first gain and a second gain. Also included is a received signal strength indication generating circuit electrically connected to the receiver which provides a signal strength indication corresponding to a strength of a signal received by the receiver. A compensated signal strength measurement generating circuit which characterizes the strength of the received signal based on a first signal strength measurement at the first gain and a second signal strength measurement at the second gain is operatively connected to the received signal strength indication generating circuit. In one embodiment of the systems of the present invention, the system further includes means for causing the receiver to operate at one of the first gain or the second gain.

While the present invention has been summarized above primarily with respect to the methods of the present invention, it is to be understood that the present invention is also directed to systems for carrying out the operations described above with respect to the method aspects of the present invention as will be described more fully herein.

The present invention is particularly beneficial when the received signal, is a signal received over a communications medium at a receiver station from a sender station. More particularly, the present invention is beneficial for use where the communications medium is a wireless communications medium such as a cellular system which utilizes mobile assisted handover, as more accurate data may be reported from the mobile to the cellular system on the relative strength of the signal from various available base stations.

DETAILED DESCRIPTION OF ILLUSTRATED EMBODIMENTS

The present invention now will be described more fully hereinafter with reference to accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Figure 1:
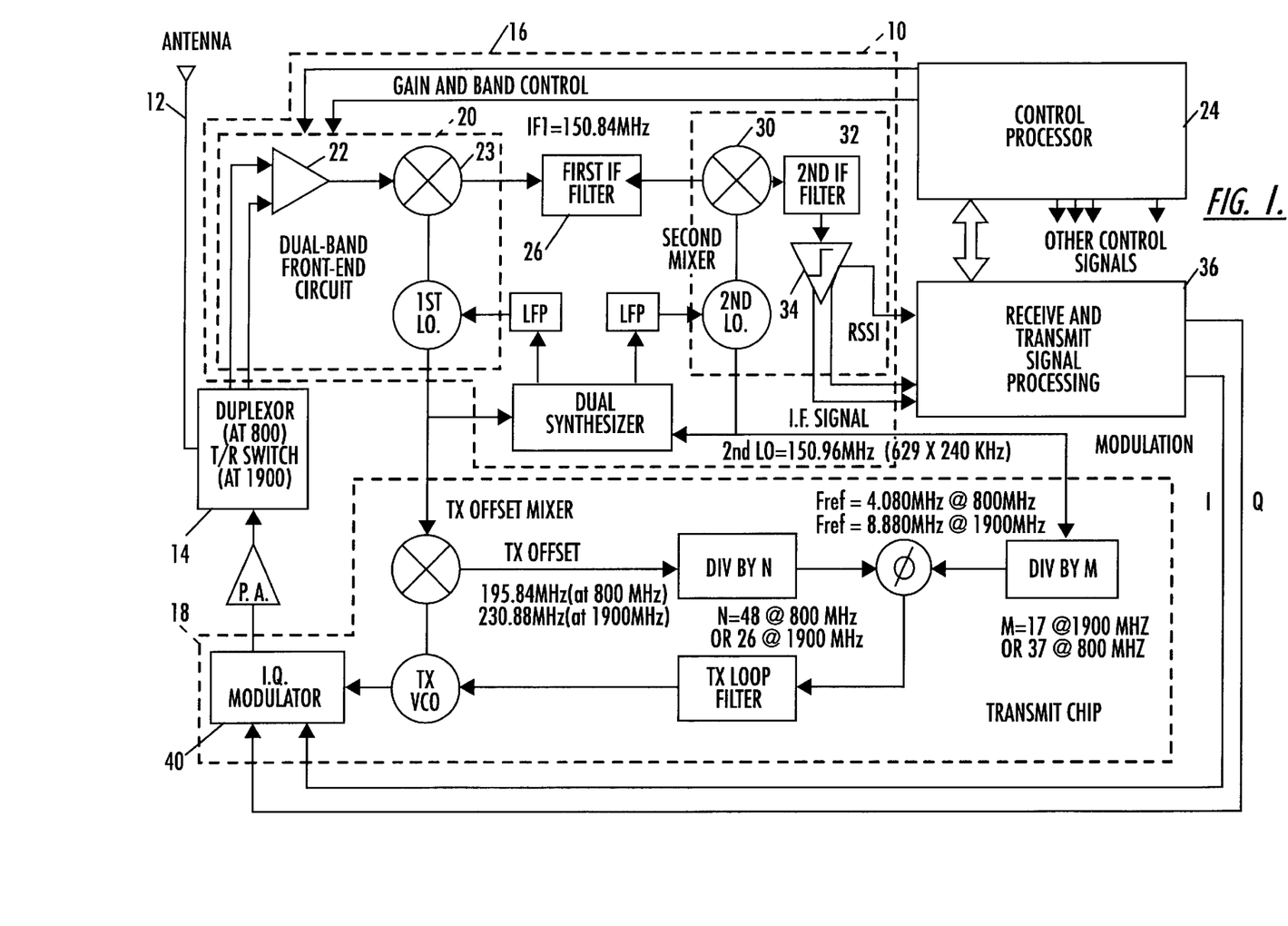
FIG. 1 is a block diagram illustrating a signal receiver apparatus according to an embodiment of the present invention.

Referring now to FIG. 1, an embodiment of a single receiver apparatus 10 according to the present invention will now be described. FIG. 1 illustrates a receiver circuit block diagram for a wireless device such a mobile phone. Receiver 10 includes an antenna 12 or other means for receiving signals over a communications medium. While it is to be understood that the present invention may be applied to signals over wired communication links, the benefits of the present invention are particularly applicable in wireless communications environments such as radio frequency transmissions over air and cellular telephone communication networks.

Signals received by antenna 12 are processed through transmit/receive duplexer 14. Duplexer 14 provides a switchable connection between antenna 12 and receive circuit 16 and transmit circuit 18. A receive signal is routed by duplexer 14 to dual band front end circuit 20. This signal is provided to front end amplifier 22. In the illustrated embodiment of FIG. 1, duplexer 14 may be a duplexing filter for simultaneous transmit and receive in an AMPS mode or, alternatively, a transmit/receive switch for operating in a time-duplex mode such as the D-AMPS mode, or, in a dual-band telephone, may comprise a duplexing filter at 800 MHz (the AMPS band) and a transmit/receive switch at 1900 MHz (the PCS band) in which only the D-AMPS time-duplex mode is used. In a dual-band telephone operating at both 800 MHz and 1900 MHz, the front-end radio frequency amplifier 22 and first super heterodyne downconverter 23 comprise circuits adapted to both frequency bands, with means to select the operating frequency band under control of the control processor 24.

As illustrated in FIG. 1, the down conversion takes place in dual-band front end circuit 20 for with processor 24 providing band selecting control information to front end circuit 20. Received signals are down converted in front end circuit 20 to a suitable first intermediate frequency (first IF). The signal is then filtered using first IF filter 26. This signal is down converted once more in second mixer circuit 30 to a second IF. Further filtering and amplification takes place at second IF filter 32 and amplifier 34 to yield a hard limited second IF signal from which amplitude modulation has been removed in addition to an RSSI signal approximately proportional to the logarithm of the receive signal strength containing the removed amplitude information. The hard limited second IF signal containing phase information plus the RSSI signal containing amplitude information are passed to the receive/transmit signal processor circuit 36 where they are processed, for example, using the method of U.S. Pat. No. 5,048,059 which has been previously incorporated herein by reference.

Receive signal processing by receive/transmit processing circuit 36 includes, among other things, analog to digital conversion of the RSSI signal. The digitized RSSI value is provided to control processor 24 for use in constructing a SACCH message to report received signal strength to the communication network for mobile assisted handover (MAHO) purposes.

Transmit signal processing by circuit 36 converts SACCH messages of voice or user data signals such as FAX signals to I, Q modulation for modulating the transmitter using I, Q modulator circuit 40. I, Q modulator circuit 40, as illustrated in FIG. 1, is part of dual-band circuit 18 which provides for a transmit carrier frequency which is separated from the selected receive frequency by a specified amount typically referred to as the duplexing spacing. Duplex spacing is typically 45 MHz for 800 MHz band operation and 8.04 MHz for 1800 MHz band operation according to the D-AMP standard IS 136. While additional details of receiver 10 are illustrated in the embodiment of FIG. 1, they will not be discussed further herein as they are not required to understand the benefits and operations of the present invention and further as they are known to those of ordinary skill in the art.

Control processor 24, in addition to providing means for controlling the band select of front end circuit 20, further includes means for controlling whether first RF amplifier 22, located in front end circuit 20 prior to the first down converter, operates at a first, fill gain or a second, reduced gain. According to one embodiment of the present invention, a reduced gain in the order of 20 dB is obtained by switching off the RF amplifier 22 current or, alternatively, by reducing its current under the control of a control signal from the control processor 24. The control processor 24 further provides means to detect when RSSI measurement values fall in a region where non-linearity of the RSSI detector characteristic or compression in the first RF amplifier 22 or second down converter 30 may reduce the measurement accuracy. This would normally only occur for strong signals that can be successfully received even with a 20 dB gain reduction in RF amplifier 22. Consequently, the control processor 24, upon detecting RSSI measurements of sufficient magnitude to be in the range or distortion could be introduced, causes a controlled reduction in the gain of RF amplifier 22 and then initiates a second RSSI measurement with the gain reduced.

The difference in the RSSI measurements with and without the gain reduction should correspond to the controlled gain reduction itself, assuming linearity. Therefore, if the gain reduction measured does not correspond to the controlled or expected gain reduction, this is indicative of a non-linearity in the RSSI detection characteristics of receiver 10. The difference in RSSI values less the expected difference corresponding to the selected gain reduction is then indicative of the amount of non-linearity and may be used, according to the present invention, by control processor 24 to compute a corrected RSSI value which has been compensated for this non-linearity. The corrected RSSI values are then used for reporting MAHO measurements to the network using the SACCH. Corrected RSSI values may also, optionally, be used for improved logpolar signal processing.

Figure 2:
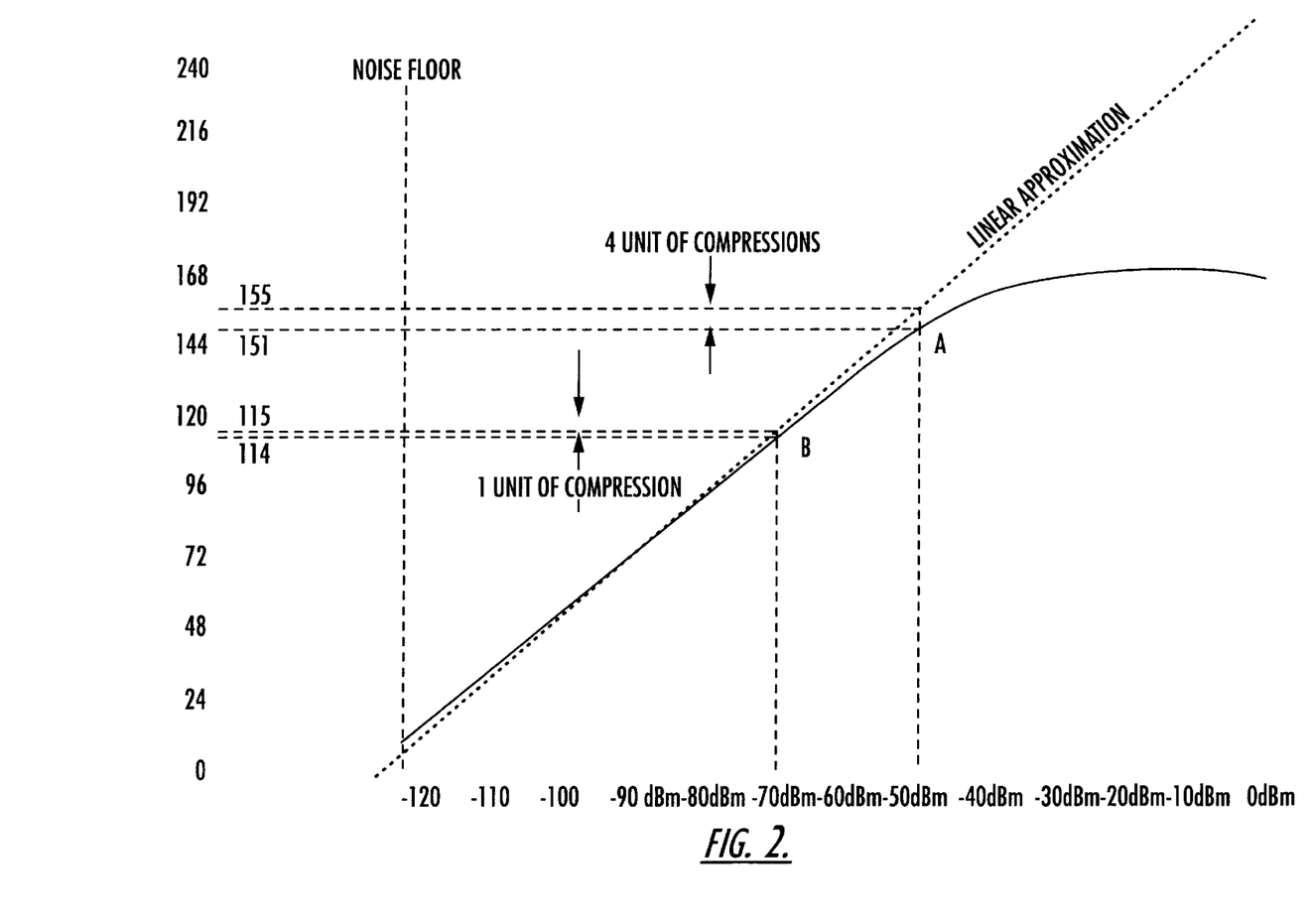
FIG. 2 is a graphical illustration of non-linear signal strength detection characteristics.

Operations for an embodiment of the present invention for a particular non-linear received signal will now be explained more fully with reference to FIG. 2. FIG. 2 shows a non-linear RSSI detection characteristic caused by compression of amplifier stages prior to the detectors which may, typically, be encountered at high signal levels. As illustrated in FIG. 2, when the RF amplifier gain is reduced by, for example, 20 dB, the RSSI change actually measured will likewise be 20 dB at small signal levels. This is illustrated by the region of FIG. 2 below −70 dBm on the X axis where the actual detected signal strength, as illustrated by the solid line, substantially tracks the linear approximation illustrated by the dotted line.

The illustrated example of FIG. 2 reflects the RSSI measurement value on the Y axis showing a range of zero to 240 approximating the value range which would typically be encountered for an 8-bit analog to digital conversion of an RSSI signal for processing by control processor 24. For purposes of the illustrated embodiments of the present invention, such an 8-bit analog to digital conversion will be assumed although it is to be understood that the benefits of the present invention may be obtained with other resolutions and are not limited to 8-bit analog to digital converters.

As is further illustrated in the example of FIG. 2, at progressively higher signal levels, the measured values of the solid line deviate from the linear approximation. The amount by which the RSSI changes, as illustrated, is less than 20 dB, indicating the amount of compression taking place over a 20 dB range of signal level. This can be best understood with reference to points A and B on FIG. 2. As illustrated in FIG. 2, the actual received signal level for point A is −50 dBm. The RSSI measurement is made with an 8-bit AtoD converter yielding an energy value between zero and 255 with the least significant bit (at small signal levels) of 0.5 dB per bit and the zero to 255 energy range corresponds nominally to the signal level range −127.5 dBm to 0 dBm. For this arrangement, the expected reading based on the nominally linear RSSI detection curve for a signal level of −50 dBm is, therefore, 155. In general, the expected reading for a signal level of X dBm is given by the formula 255 −2X. As can be seen by the readings at point A of FIG. 2, however, the actual reading at −50 dBm is not 155, but is instead 151. This indicates an error of 4 counts or, approximately, 2 dB (at 0.5 dB per bit). The apparent signal level is therefore, detected at −52 dBm as compared with the true value of −50 dBm.

According to the methods and systems of the present invention, a second set of readings is taken at point B to provide information for use in compensating the RSSI measurement. Control processor 24 reduces the gain of front end amplifier 22 by a controlled amount, for example, 20 dB as illustrated in FIG. 2. Therefore, the actual signal level passed through to the RSSI detectors at point B is expected to be −70 dBm, i.e., 20 dB lower than the previous −50 dBm. An RSSI reading is taken again at point B with the expected reading as 115. However, as can be seen from FIG. 2, some non-linearity is still present and the actual reading obtained with the 20 dB program gain reduction is not 115, but instead is 114. This reflects an error of 0.5 dB at the −70 dBm signal level.

The change in the signal readings from 151 to 114, a decrease of 37, compares with the expected change of reading of 40 bits based on 0.5 dB per least significant bit (LSB). This indicates that the compression at a reading of 151 is 3 units (or bits) more than the compression at a reading of 114. The control processor 24, according to the illustrated embodiment of the present invention, therefore adds a compensating amount of 3 units to the reading of 151. Further accuracy may be provided by also adding to the RSSI reading a compensating amount previously determined and stored for the reading of 114. For example, assuming that a similar RSSI compensating measurement sequence had previously taken place and determined a compensating amount of one unit per reading of 114, then the reading of 151 illustrated in FIG. 2 would be compensated by adding three units plus an additional one unit to obtain a compensated RSSI value of 155. This would compensate the RSSI value and set it equal to the expected value, thereby correcting the 2 dB error in the reading and providing a more accurate value for the signal strength measurement.

In the illustrated embodiment, control processor 24 may also estimate the compensation factor to be added at other signal strengths between −70 dBm and −50 dBm by assuming that the 3 units of compression over this 20 dB range would be proportionally less over a smaller range. For example, at −60 dBm, the control processor 24 would anticipate 1.5 units of compression, as −60 dBm is half way between −70 and −50 dBm, therefore half the number of units of compression is anticipated for a linear model. This is added to the amount of compression already estimated on a previous occasion for −70 dBm (assumed to be 1 unit above) to obtain a total of 2.5 units for −60 dBm. In this way, the control processor 24 may compute the expected compression for every signal level (RSSI reading) over the range −50 dBm to −70 dBm (corresponding to uncorrected RSSI readings of 114 to 151) and store them in a memory means such as a look-up table in Electrically Erasable and Reprogrammable Memory (EEPROM) or other, preferably non-volatile, storage means. By repeating the procedure on other occasions while receiving other signal strengths, the table may be filled with learned correction values for each reading level (0–255).

Once the table is filled, future computations will result in new values of compensation for a signal level reading that may or may not be identical to a previously estimated value. When this occurs, the new estimated values can be substituted or alternatively averaged with the previous values. For example, the previous value can be adjusted a fraction of the way towards the new value, for example, $\frac{1}{16}^{th}$ or other reciprocal power of two may be chosen to facilitate division by a right-shift of the difference between the old and new values in simple microprocessors.

As will be appreciated by those of skill in the art, the above described aspects of the present invention in FIGS. 1, and 2 may be provided by hardware, software, or a combination of the above. While the various components of the systems of the present invention have been illustrated in part as discrete elements in FIG. 1, they may, in practice, be implemented by a microcontroller including input and output ports and running software code, by custom or hybrid chips, by discrete components or by a combination of the above.

Figure 3:
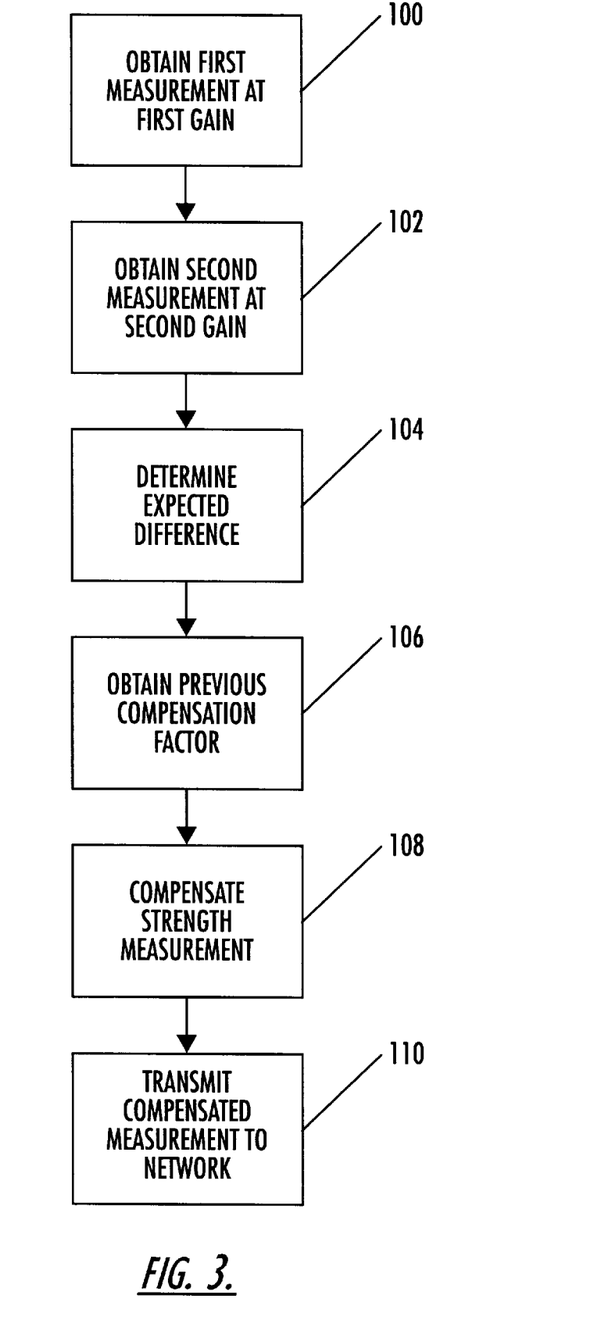
FIG. 3 is a flowchart illustrating operations according to an embodiment of the present invention.

FIG. 3 shows a flow chart further illustrating operations of an embodiment of the present invention. At block 100, a first signal strength measurement of the received signal is obtained with receiver 10 set at a first gain level. A second signal strength measurement of the received signal is obtained with receiver 10 set at a second gain level at block 102. At block 104, the expected difference between the first signal strength measurement and the second signal strength measurement is determined based on the first gain level and the second gain level. For example, if the gain level is dropped by 20 dB, the expected difference between the two readings would be 20 dB. The actual difference between the first signal strength measurement and the second signal strength measurement is also generated at block 104 by subtracting the two measurement values.

At block 106, a previously determined compensation factor associated with the second signal strength measurement is obtained, preferably from a memory storage means operatively associated with receiver 10. Also at block 106, the actual difference is compared to the expected difference to provide a signal strength compensating factor. A compensated signal strength measurement is generated at block 108 based on the signal strength compensating factor and the previously determined compensation factor associated with the second signal strength measurement. The compensated signal strength measurement, in one embodiment of the present invention, is generated by summing the signal strength compensating factor, the previously determined compensation factor associated with the second signal strength measurement and the first signal strength measurement. The compensated signal strength measurement is transmitted to the communication network for use in mobile assisted handover at block 110.

The above-described procedure functions both for RSSI curves that give too low a reading and for RSSI curves that sometimes yield too high a reading, that is for both concave and convex curves as well as S-shaped curves. Optionally, an initial table of compensation values can be determined in the factory during production testing and programmed into the EPROM or EEPROM of the receiver 10. Subsequently, after delivery to a customer, the table can be read from such memory into Random Access Memory (RAM) for updating based on RSSI measurements made during further use. Values updated in RAM may be rewritten to EEPROM if it is desired to remember the updated values for future use. Alternatively, the factory-programmed values may be recalled every time receiver 10 is switched on and updated values produced only for that period of use.

In a TDMA system such as the GSM/PCS1900 system or in the DAMPS/IS54/IS136 system, spare time between transmit and receive timeslots is used by the mobile phone receiver 10 during active conversation to make RSSI measurements on other base station's signals. The network will generally previously have downloaded to the mobile phone a list of the channel numbers of surrounding base stations on which measurements should be made. In GSM, roughly 220 measurements per second are typically made and in D-AMPS 50 measurements are made on typically 6 surrounding base stations. Thus, repeat measurements on the same base station are typically made several times per second and may, optionally, be averaged over a moving time window to obtain a moving average signal strength for each base station in the list. According to one aspect of the present invention, the moving average may be based on compensated RSSI values.

The moving average may also be used to predict the signal level that the next measurement of a previously measured base station will produce. If the predicted signal level is in a range where significant compression or other significant departure from a linear RSSI curve is expected (or has previously been determined according to the methods of the present invention as described above), particularly at high signal levels, then the control processor 24 responds by starting the new measurement on that base station with reduced gain at RF amplifier 22.

In one embodiment of the method aspects of the present invention, successive measurements are made when the moving average signal level is in such a range. This procedure has further benefits that false RSSI readings due to receiver imperfections such as intermodulation and blocking may be detected and eliminated so that they do not result in false handovers. For example, a false reading caused by $3^{rd}$ order intermodulation between two strong signals appearing as a third signal on a measurement channel will give a much stronger reading with full gain than with −20 dB reduced gain—but only on that particular frequency. If its has previously been determined that such an RSSI curve anomaly does not occur at another channel frequency, the anomaly may be recognized as a frequency anomaly rather than an RSSI curve anomaly and the measurement value at full gain may be discarded. The measurement at reduced gain may then be used, suitably compensated for the compensation factor at the reduced signal level (if any), and compensated by the amount of gain reduction. In this way, the inventive method may also protect against false handovers to base stations that only appear to be received strongly due to an intermodulation phenomenon.

Referring now to the flowchart of FIG. 4, operations according to a further aspect of the present invention will now be described. At block 200, control processor 24 selects the next frequency from the MAHO list on which a measurement of single strength is to be made. For a TDMA type communication network, control processor 24 further waits for the scan time slot dedicated to monitoring transmissions from various available base stations. At block 204, control processor 24 determines if the expected signal strength, as indicated by a current moving average value associated with this selected frequency, exceeds a predetermined limit (i.e., lies in a region where measurement error may be expected). If the expected signal strength indicates potential error at block 204, operations proceed at block 206 to determine if a previous measurement was taken for the selected MAHO frequency. At block 208, if a previous measurement was made, operations continue by checking whether the previous measurement was made at reduced gain. If the previous measurement was made with reduced gain, the new measurement will be made with full gain by selecting full gain at block 210. Otherwise, reduced gain is selected at block 212. Reduced gain is also selected if, at block 206, it is determined that no previous measurement was made. In other words, if an expected signal strength is in the error region, the first reading is taken with reduced gain rather than full gain. If the expected signal strength does not indicate potential error at block 204, full gain is selected at block 210. Operations at blocks 206 and 208 provide for alternating measurements will full and reduced gain. Note that while not illustrated in FIG. 3, if there is no previous reading, i.e., if the reading is for the first time on a new MAHO frequency channel (meaning there is no basis on which to establish a moving, average value for that channel), the initial measurement will be made with reduced gain. If the initial or first measurement indicates a low signal strength, then the second measurement on that same channel will be made with full gain (block 210) based upon the test at block 204.

Having selected either fall or reduced gain for a new measurement, control processor 24 takes the measurement at block 214 with the selected gain. A new measurement is processed together with previous measurements, if they were made with different gain values, to determine updated compensation values using the above-described methods according to the present invention (block 216). At block 218, the most recent measurement is compensated using the appropriate one of the updated compensation values. The compensated measurement is then used at block 220 to update the moving average signal strength for the updated MAHO frequency channel before returning to block 200 to select the next MAHO frequency channel.

Figure 4:
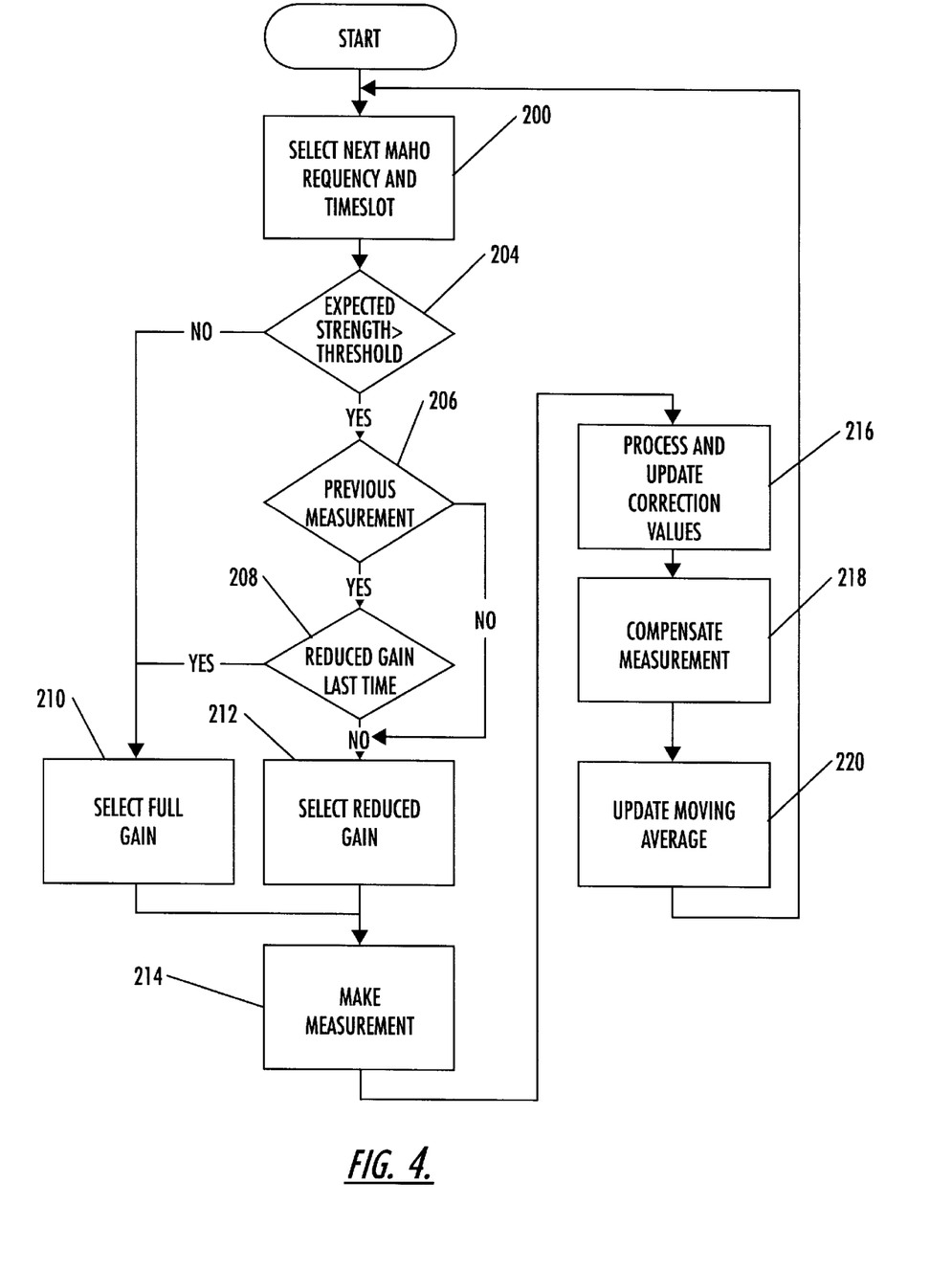
FIG. 4 is a flowchart illustrating operations according to an embodiment of the present invention.

For simplicity in illustration, FIG. 4 omits various of the details of operations according to preferred embodiments of the present invention. For example, the steps of storing new and previous measurements and of storing, for each MAHO frequency channel, a memory of whether the previous measurement was made with full or reduced gain or whether no previous measurement exists are not expressly shown in FIG. 4 although they have been described herein. These steps are preferably included in a practical implementation of systems and methods according to the present invention.

To a first order approximation, the compression was assumed in the above discussion to onset in a linear manner providing that the compression in dB would be half the amount for a signal 10 dB lower than the measured level as compared with a signal 20 dB lower. The amount of compensation to be used at intermediate levels within the 20 dB band was determined using the linear first order approximation. However, it is to be understood that other models of compression may be utilized with the present invention based, for example, on higher order polynomials rather than a straight line or linear assumption, to provide for increased accuracy of measurements of the RSSI characteristics for the intervening values.

The present invention has been described above with respect to FIGS. 3 and 4 with reference to flowcharts illustrating the operation of the present invention. It will be understood that each block of the flowchart illustrations, and combinations of blocks in the flowchart illustrations, can be implemented by computer program instructions. These program instructions may be provided to a processor to produce a machine, such that the instructions which execute on the processor create means for implementing the functions specified in the flowchart block or blocks. The computer program instructions may be executed by a processor to cause a series of operational steps to be performed by the processor to produce a computer implemented process such that the instructions which execute on the processor provide steps for implementing the functions specified in the flowchart block or blocks.

Accordingly, blocks of the flowchart illustrations support combinations of means for performing the specified functions, combinations of steps for performing the specified functions and program instruction means for performing the specified functions. It will also be understood that each block of the flowchart illustration, and combinations of blocks in the flowchart illustration, can be implemented by special purpose hardware-based systems which perform the specified functions or steps, or combinations of special purpose hardware and computer instructions.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed:

1. A method for measuring a strength of a received signal comprising the steps of:

determining an expected strength of a signal strength measurement of the received signal;

obtaining a first signal strength measurement of the received signal from a receiver set at a first gain level;

obtaining a second signal strength measurement of the received signal from the receiver set at a second gain level if the expected strength at least meets a predetermined criteria; and generating a compensated signal strength measurement characterizing the strength of the received signal based on the first signal strength measurement and the second signal strength measurement, wherein the compensated signal strength measurement is the first signal strength measurement if the expected strength at least meets a predetermined criterion.

2. A method according to claim 1 wherein the compensated signal strength measurement is compensated for non-linear characteristics of the receiver.

3. A method according to claim 2 wherein the second gain level is less than the first gain level.

4. A method according to claim 2 wherein the first and second signal strength measurements are logarithmic received signal strength indications.

5. A method for measuring a strength of a received signal comprising the steps of:

obtaining a first signal strength measurement of the received signal from a receiver set at a first gain level;

obtaining a second signal strength measurement of the received signal from the receiver set at a second gain level; and generating a compensated signal strength measurement characterizing the strength of the received signal based on the first signal strength measurement and the second signal strength measurement, the compensated signal strength measurement being compensated for non-linear characteristics of the receiver;

wherein the step of generating a compensated signal strength measurement comprises the steps of:

determining an expected difference between the first signal strength measurement and the second signal strength measurement based on the first gain level and the second gain level;

generating the actual difference between the first signal strength measurement and the second signal strength measurement;

comparing the actual difference to the expected difference to provide a signal strength compensating factor; and generating the compensated signal strength measurement based on the signal strength compensating factor.

6. A method according to claim 5 wherein the step of generating the compensated signal strength measurement based on the signal strength compensating factor comprises the step of summing the signal strength compensating factor and the first signal strength measurement to provide the compensated signal strength measurement.

7. A method according to claim 5 wherein the received signal is a radio communications signal from a communication network and further comprising the step following the summing step of:

transmitting the compensated signal strength measurement to the network for use in mobile assisted handover.

8. A method according to claim 5 wherein the step of generating the compensated signal strength measurement based on the signal strength compensating factor comprises the steps of:

obtaining a previously determined compensation factor associated with the second signal strength measurement; and summing the signal strength compensating factor, the previously determined compensation factor associated with the second signal strength measurement and the first signal strength measurement to provide the compensated signal strength measurement.

9. A method according to claim 8 wherein the received signal is a radio communications signal from a communication network and further comprising the steps following the summing step of:

averaging the compensated signal strength measurement with an earlier compensated signal strength measurement to provide an averaged signal strength measurement; and transmitting the averaged signal strength measurement to the network for use in mobile assisted handover.

10. The method of claim 8 further comprising the steps following said summing step of:

obtaining a previously determined compensation factor associated with the second signal strength measurement; and adjusting the previously determined compensation factor associated with the second signal strength measurement based on the signal strength compensating factor to provide an updated compensation factor associated with the second signal strength measurement.

11. A system for measuring a strength of a received signal comprising:

a receiver capable of operating at a first gain and a second gain;

means for determining an expected signal strength of a next signal strength measurement of the received signal;

a received signal strength indication generating circuit electrically connected to the receiver which provides a signal strength indication corresponding to a strength of a signal received by the receiver; and a compensated signal strength measurement generating circuit which characterizes the strength of the received signal based on a first signal strength measurement at the first gain and a second signal strength measurement at the second gain.

12. A system according to claim 11 wherein the compensated signal strength measurement generating circuit further comprises:

means for causing the receiver to operate at one of the first gain or the second gain.

13. A system according to claim 11 wherein the compensated signal strength measurement generating circuit compensates for non-linear characteristics of the receiver.

14. A system according to claim 13 wherein the signal strength indication is a logarithmic received signal strength indication.

15. A system for measuring a strength of a received signal comprising:

a receiver capable of operating at a first gain and a second gain;

a received signal strength indication generating circuit electrically connected to the receiver which provides a signal strength indication corresponding to a strength of a signal received by the receiver;

a compensated signal strength measurement generating circuit which characterizes the strength of the received signal based on a first signal strength measurement at the first gain and a second signal strength measurement at the second gain; and wherein the compensated signal strength measurement generating circuit comprises:

means for determining an expected difference between the first signal strength measurement and the second signal strength measurement;

means for generating an actual difference between the first signal strength measurement and the second signal strength measurement;

means for comparing the actual difference to the expected difference to provide a signal strength compensating factor; and means for generating a compensated signal strength measurement based on the signal strength compensating factor.

16. A system according to claim 15 wherein the means for generating a compensated signal strength measurement based on the signal strength compensating factor comprises means for summing the signal strength compensating factor and the first signal strength measurement to provide the compensated signal strength measurement.

17. A system according to claim 15 wherein the received signal is a radio communications signal from a communication network and further comprising:

means for transmitting the compensated signal strength measurement to the network for use in mobile assisted handover.

18. A system according to claim 15 wherein the means for generating a compensated signal strength measurement based on the signal strength compensating factor comprises:

means for obtaining a previously determined compensation factor associated with the second signal strength measurement; and means for sumniming the signal strength compensating factor, the previously determined compensation factor associated with the second signal strength measurement and the first signal strength measurement to provide the compensated signal strength measurement.

19. A system according to claim 18 wherein the received signal is a radio communications signal from a communication nework and further comprising:

means for averaging the compensated signal strength measurement with an earlier compensated signal strength measurement to provide an averaged signal strength measurement; and means for transmitting the averaged signal strength measurement to the network for use in mobile assisted handover.

20. A system according to claim 18 further comprising:

memory means for storing a previously determined compensation factor associated with the second signal strength measurement; and means for adjusting the previously determined compensation factor associated with the second signal strength measurement based on the signal strength compensating factor and for storing the adjusted previously determined compensation factor associated with the second signal strength measurement in the memory means.

* * * * *

UNITED STATES PATENT AND TRADEMARK OFFICE
CERTIFICATE OF CORRECTION

PATENT NO. : 6,006,077
DATED : December 21, 1999
INVENTOR(S) : Eric A. Shull It is certified that error appears in the above-indentified patent and that said Letters Patent is hereby corrected as shown below:

In Claim 18, Col. 14, line 4, change "sumniming" to --summing--

Signed and Sealed this

Twentieth Day of March, 2001

Attest:

NICHOLAS P. GODICI

*Attesting Officer*     *Acting Director of the United States Patent and Trademark Office*